United States Patent
Chu et al.

(10) Patent No.: US 7,760,607 B2
(45) Date of Patent: Jul. 20, 2010

(54) METHOD AND APPARATUS FOR PERFORMING BLANK DETECTION ON AN OPTICAL STORAGE DISC

(75) Inventors: Chin-Huo Chu, Kao-Hsiung Hsien (TW); Chun-Ying Chiang, Chia-I (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/019,643

(22) Filed: Jan. 25, 2008

(65) Prior Publication Data

US 2008/0112294 A1 May 15, 2008

Related U.S. Application Data

(63) Continuation of application No. 10/905,428, filed on Jan. 4, 2005, now Pat. No. 7,349,312.

(30) Foreign Application Priority Data

Jul. 23, 2004 (TW) .............................. 93122120 A

(51) Int. Cl.
*G11B 7/00* (2006.01)
(52) U.S. Cl. .................................. 369/53.32

(58) Field of Classification Search ............... 369/53.32
See application file for complete search history.

(56) References Cited

U.S. PATENT DOCUMENTS

| 5,155,636 A | | 10/1992 | Odaka | |
|---|---|---|---|---|
| 5,475,820 A | * | 12/1995 | Natrasevschi et al. | 711/100 |
| 5,577,242 A | * | 11/1996 | Yamaguchi et al. | 707/205 |
| 6,532,335 B2 | * | 3/2003 | Otomo et al. | 386/95 |
| 6,728,180 B1 | * | 4/2004 | Park | 369/53.11 |
| 6,839,798 B1 | * | 1/2005 | Nagayoshi et al. | 711/103 |
| 7,203,891 B2 | * | 4/2007 | Lee et al. | 714/769 |
| 2002/0152349 A1 | | 10/2002 | Kageyama | |
| 2003/0039178 A1 | | 2/2003 | Sugiyama | |
| 2004/0076101 A1 | * | 4/2004 | Suh et al. | 369/59.25 |
| 2004/0257937 A1 | * | 12/2004 | Kato et al. | 369/47.22 |

* cited by examiner

*Primary Examiner*—Peter Vincent Agustin
(74) *Attorney, Agent, or Firm*—Winston Hsu

(57) ABSTRACT

A method for performing blank detection on an optical storage disc includes receiving information read by an optical storage device from the optical storage disc, and checking corresponding data of the information to operate blank detection.

10 Claims, 4 Drawing Sheets

METHOD AND APPARATUS FOR PERFORMING BLANK DETECTION ON AN OPTICAL STORAGE DISC

CROSS REFERENCE TO RELATED APPLICATIONS

This application is a continuation application and claims the benefit of U.S. application Ser. No. 10/905,428, filed on Jan. 4, 2005, now U.S. Pat. No. 7,349,312.

BACKGROUND

The present invention relates to optical storage devices, and more particularly, to a method and an apparatus for performing blank detection involved with Error Correction Code (ECC) decoding of information read from an optical storage disc.

Digital Versatile Discs (DVDs) and DVD drives are typical of the optical storage discs and optical storage devices, respectively. When the data flow generated by the optical storage device while reading the optical storage disc is interrupted, the decoder for decoding the data flow is not able to output a proper decoded signal. For example, the decoder for decoding the data flow will output a blank signal. A method for solving the data flow interruption problem mentioned above is to perform blank detection on the optical storage disc to control the decoder's decoding action on the data flow according to detection results of the blank detection. In this way, the decoder neither stops outputting signals nor outputs blank signals.

According to the blank detection method of the related art, when a processing unit of a front stage in the optical storage device detects the interruption of the data flow during a reading process, an optical pickup module of the optical storage device will be returned to an earlier location corresponding to data that has already been read but not yet buffered. That is, the optical storage device must reread and buffer the data that has not been buffered for further decoding. As the control of the blank detection mentioned above, the reading action of the optical pickup module, and the buffering control of the data flow correspond to independent control processes respectively, the optical storage device has to firstly perform the reading action of the optical pickup module, secondly perform the blank detection, then perform the reading action of the optical pickup module again, and finally perform the buffering control mentioned above.

As a result of the blank detection method of the related art, although the data flow interruption problem mentioned above is solved, a new problem of repeating the reading action of the optical pickup module is introduced. The optical storage device has to waste time moving the optical pickup module around the same region of the optical storage disc and rereading the same data stored in that region. An improved blank detection method is therefore required so that the performance of the optical storage device may be enhanced.

SUMMARY

The present invention provides a method for performing blank detection on an optical storage disc. The method comprises: receiving information read by an optical storage device from the optical storage disc; and checking corresponding data of the information to operate blank detection.

Accordingly, the present invention further provides a circuit for performing blank detection on an optical storage disc. The circuit comprises: a buffering module for receiving information read by an optical storage device from the optical storage disc; and a checking module electrically connected to the buffering module for checking corresponding data of the information to operate blank detection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
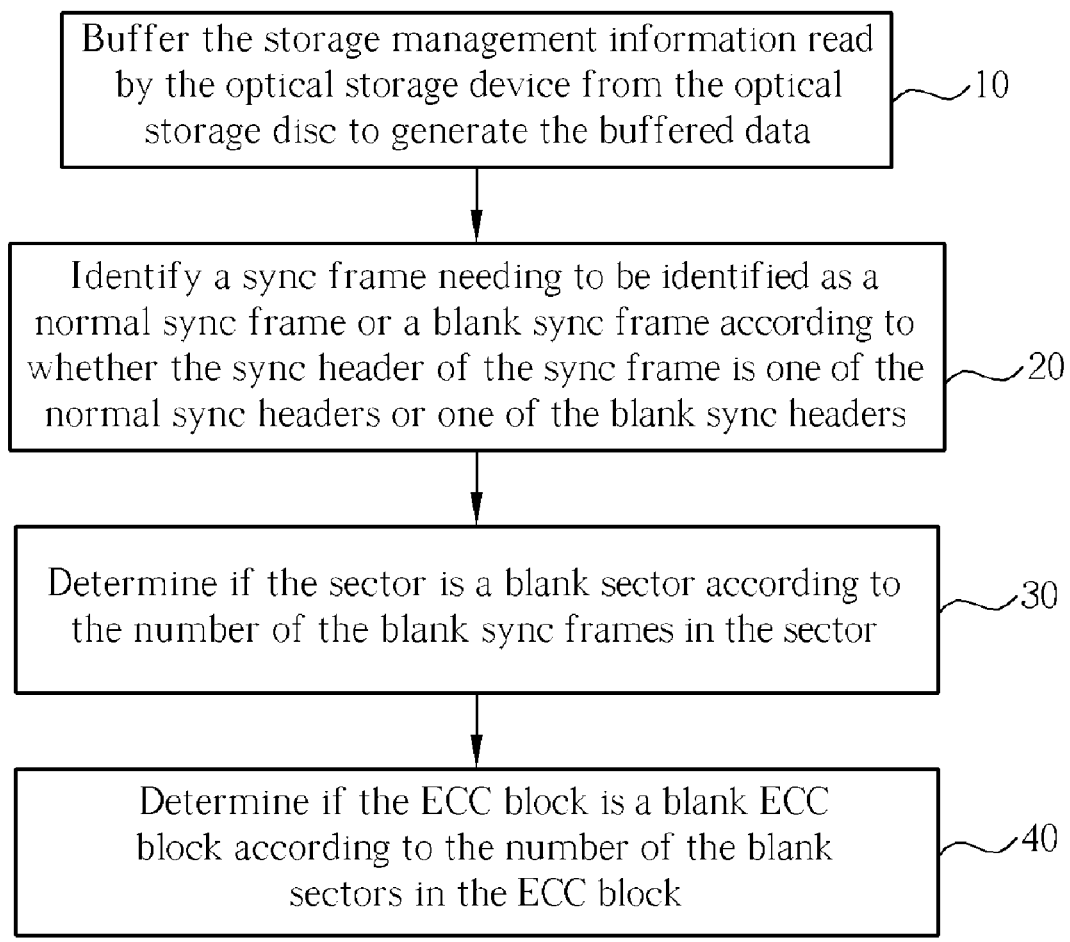
FIG. 1 is a flowchart of a method for performing blank detection on an optical storage disc according to a preferred embodiment of the present invention.
Figure 2:
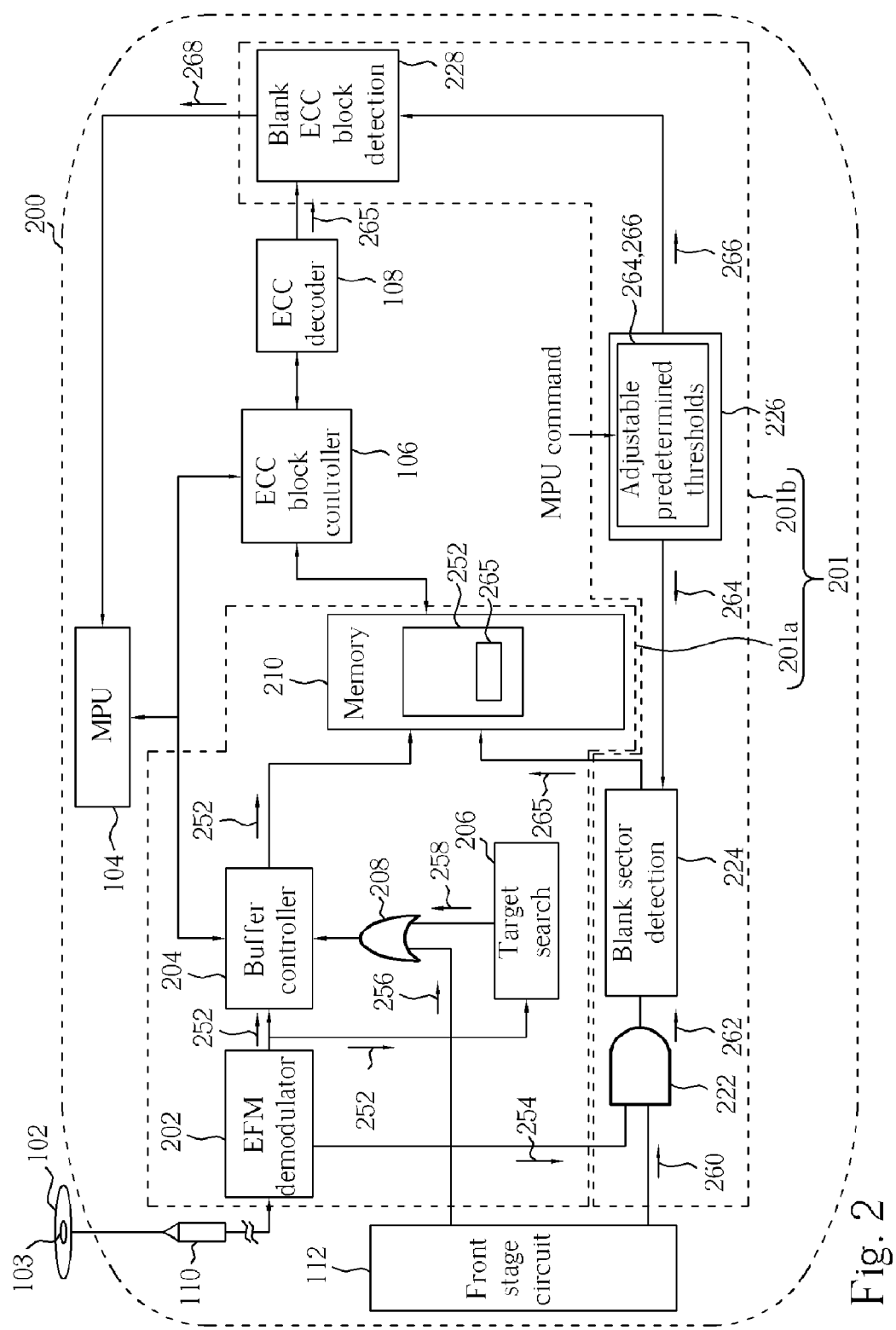
FIG. 2 is a block diagram of a circuit for performing the blank detection on the optical storage disc according to the preferred embodiment of the present invention.

Please refer to FIG. 1 and FIG. 2. FIG. 1 is a flowchart of a method for performing blank detection on an optical storage disc 102 according to a preferred embodiment of the present invention, and FIG. 2 is a block diagram of a circuit 201 for performing the blank detection on the optical storage disc 102 according to the preferred embodiment of the present invention. The circuit 201, also referred to as the blank detection circuit 201, is installed in an optical storage device 200 as illustrated in FIG. 2. The optical storage device 200 includes a microprocessor unit (MPU) 104, an Error Correction Code (ECC) block controller 106, an ECC decoder 108, an optical pickup module 110, and a front stage circuit 112. In addition, the blank detection circuit 201 includes a buffering module 201a and a checking module 201b. The buffering module 201a is capable of buffering storage management information 103 read by the optical pickup module 110 from the optical storage disc 102 to generate buffered data 252. The checking module 201b is electrically connected to the buffering module 201a and is used for checking corresponding data of an ECC block in the buffered data 252 to determine if the ECC block is a blank ECC block. According to this embodiment, the optical storage disc 102 and the optical storage device 200 are a Digital Versatile Disc (DVD) and a DVD drive, respectively. In addition, the storage management information 103 represents data recording states of the optical storage disc 102. If the optical storage disc 102 complies with the DVD-R/RW specification, the storage management information 103 can be the information of the Recording Management Data (RMD). If the optical storage disc 102 complies with the DVD+R specification, the storage management information 103 can be the information of the Table of Content (TOC)/Disc Control Block (DCB).

The buffering module 201a includes a demodulator 202 coupled to the optical pickup module 110 for demodulating the data flow of the buffered data 252; a buffer controller 204 electrically connected to the demodulator 202 for controlling the data flow of the buffered data 252; a target search unit 206 electrically connected to the demodulator 202 for generating a logical address search signal 258 according to the buffered data 252 to control the buffer controller 204; an OR logic gate 208 electrically connected to the target search unit 206, the buffer controller 204, and the front stage circuit 112 for controlling the buffer controller 204 according to a physical address search signal 256 generated by the front stage circuit 112 and the logical address search signal 258; and a memory 210 electrically connected to the buffer controller 204 for storing the buffered data 252. The buffering module 201a is capable of seeking locations within the buffered data 252 according to the physical address search signal 256 and the logical address search signal 258.

Figure 3:
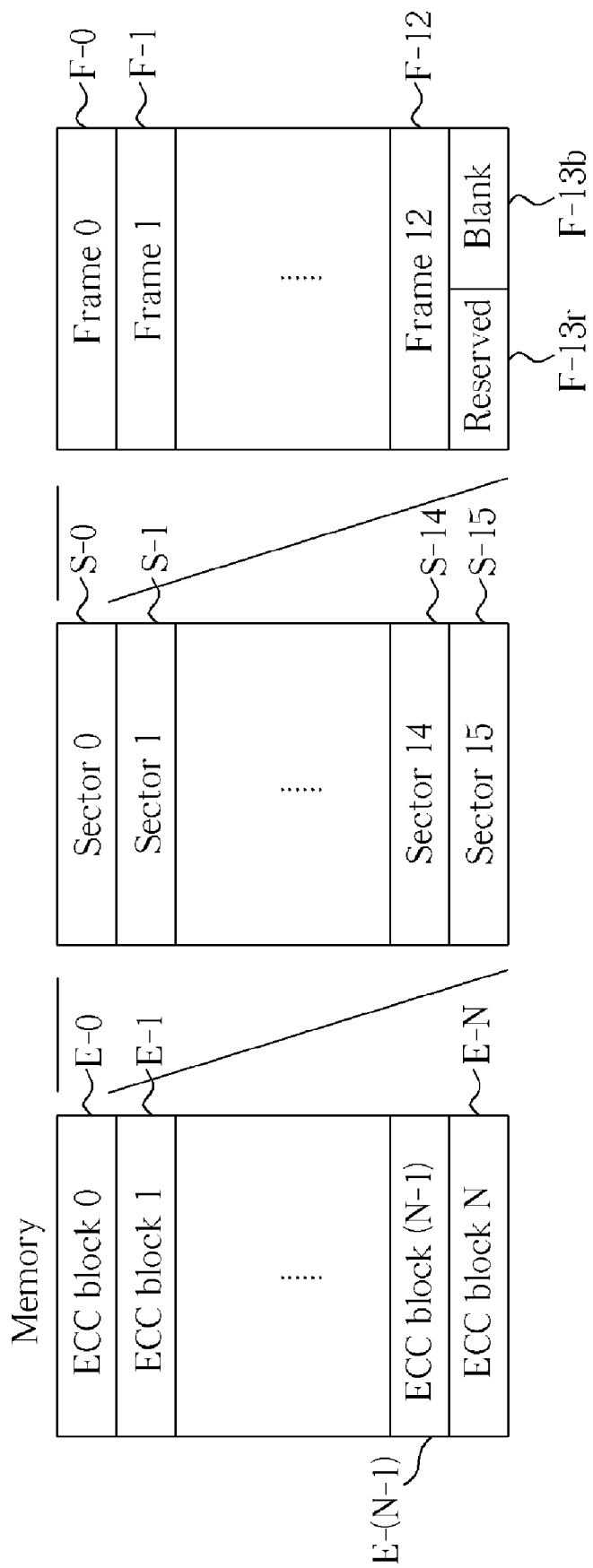
FIG. 3 is a data structure diagram of buffered data stored in the memory shown in FIG. 2.
Figure 4:
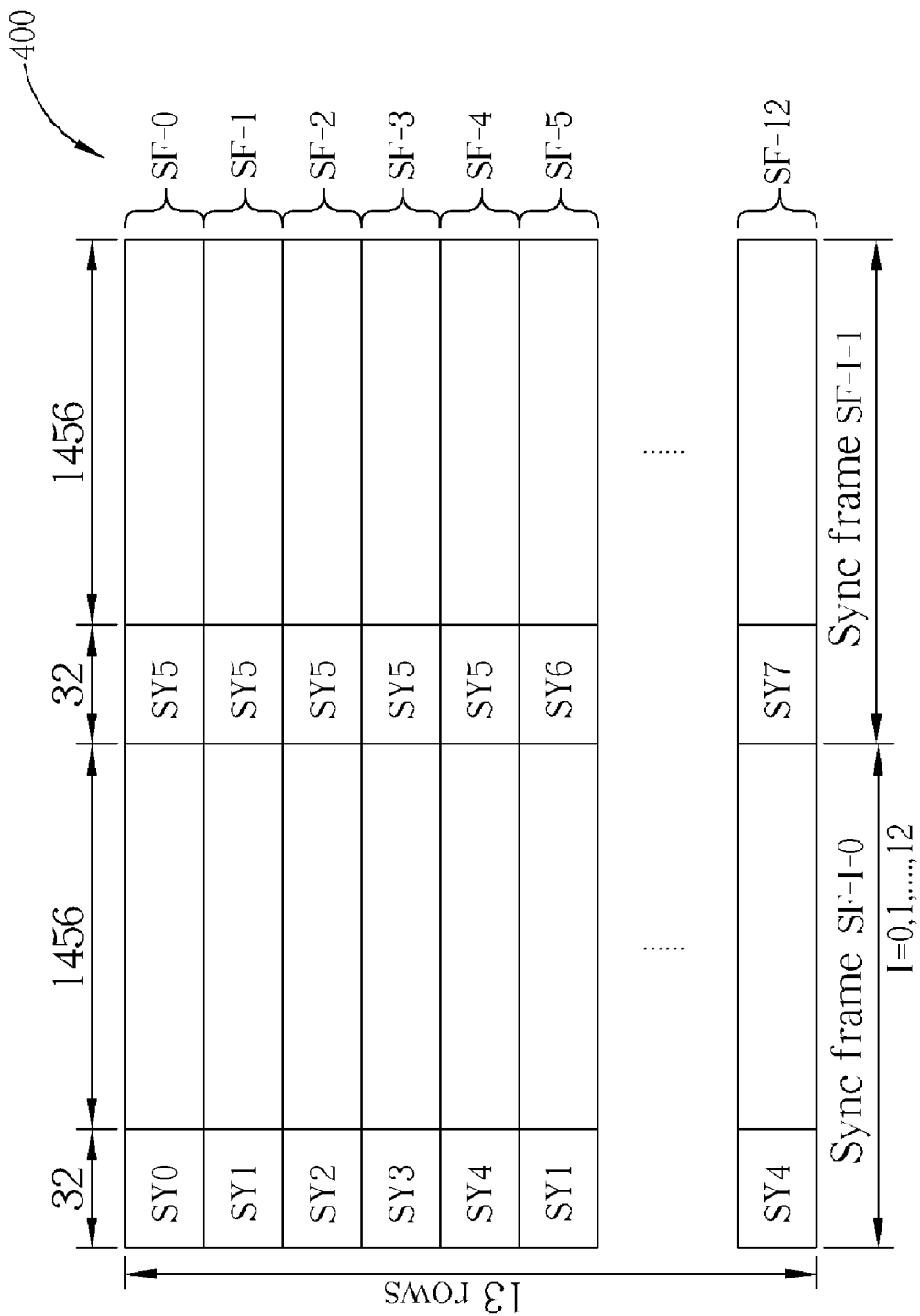
FIG. 4 is a data structure diagram of the data flow of the buffered data shown in FIG. 2.

The checking module 201b includes an AND logic gate 222 electrically connected to the demodulator 202 and the front stage circuit 112 for deriving blank header information 262 from a sync signal 254 outputted by the demodulator 202 according to a blank signal 260 generated by the front stage circuit 112; a threshold storage unit 226 coupled to the MPU 104 for storing two predetermined thresholds 264 and 266; a blank sector detection unit 224 electrically connected to the AND logic gate 222, the threshold storage unit 226, and the memory 210 for determining if a sector in the buffered data 252 is a blank sector according to the blank header information 262 derived by the AND logic gate 222 and the predetermined threshold 264, and generating at least one blank sector detection record 265 correspondingly; and a blank ECC block detection unit 228 electrically connected to the threshold storage unit 226 and the MPU 104 and coupled to the memory 210 through the ECC block controller 106 and the ECC decoder 108 for determining if an ECC block is a blank ECC block according to the blank sector detection record 265 and the predetermined threshold 266 during the decoding process of the decoder 108. As illustrated in FIG. 2, the blank sector detection unit 224 stores the blank sector detection record 265 in the memory 210, and the blank ECC block detection unit 228 derives the blank sector detection record 265 from the memory 210. When a detection result of the blank ECC block detection unit 228 indicates that the ECC block is a blank ECC block, the blank ECC block detection unit 228 outputs an interruption signal 268 to the MPU 104 to complete the detection process of the present invention method. This detection process is referred to herein as the blank detection method. Please note that the order of the following steps is not a limitation to the present invention method. The detection process is as follows:

Step 10: Buffer the storage management information 103 read by the optical storage device 200 from the optical storage disc 102 using the buffering module 201a to generate the buffered data 252. Each ECC block E-0, E-1, . . . , E-N of the buffered data 252 includes sixteen sectors S-0, S-1, . . . , and S-15, and each sector S-0, S-1, . . . , S-15 includes thirteen frames F-0, F-1, . . . , and F-12. In addition, the frames F-0, F-1, . . . , and F-12 shown in FIG. 3 correspond to sync frame sets SF-0, SF-1, . . . , and SF-12 shown in FIG. 4, respectively. Wherein each sync frame set SF-I (I=0, 1, . . . , 12) out of the sync frame sets SF-0, SF-1, . . . , and SF-12 includes two sync frames SF-I-0 and SF-I-1 in the data flow of the buffered data 252. In contrast to the data format of the data flow of the buffered data 252, the data format in the memory 210 further includes two additional regions. As illustrated in FIG. 3, the two additional regions include the reserved region F-13r and the blank region F-13b. Both the reserved region F-13r and the blank region F-13b illustrated in FIG. 3 are appended to the end of the frame F-12 when the data flow of the buffered data 252 is stored in the memory 210. When the data flow of the buffered data 252 is interrupted, the optical storage device 200 is capable of generating blank sync headers SY0', SY1', . . . , and SY7' according to a physical wobble signal of the optical storage disc 102 so that the data flow of the blank sync headers SY0', SY1', . . . , and SY7' and the data flow of the storage management information 103 form the buffered data 252 that is continuously arranged. Similar to normal sync headers SY0, SY1, . . . , and SY7 illustrated in FIG. 4, the blank sync headers SY0', SY1', . . . and SY7' are used for identifying the relative locations of the sync frames SF-I-0, SF-I-1 (I=0, 1, . . . 12) with respect to the sector 400 that the sync frames SF-I-0 and SF-I-1 belong to.

Step 20: Identify a sync frame SF-I-J (I=0, 1, . . . , 12, and J=0, 1) needing to be identified in the sync signal 254 as a normal sync frame or a blank sync frame according to whether the sync header of the sync frame SF-I-J is one of the normal sync headers SY0, SY1, . . . , and SY7 or one of the blank sync headers SY0', SY1', . . . , and SY7'. More specifically, when the sync header of the sync frame SF-I-J is one of the blank sync headers SY0', SY1', . . . , and SY7', the sync frame SF-I-J is a blank sync frame. According to this embodiment, this step is implemented by using the AND logic gate 222 to derive the blank header information 262 from the sync signal 254 outputted by the demodulator 202 according to the blank signal 260.

Step 30: Determine if the sector 400 is a blank sector according to the number of the blank sync frame(s) in the sector 400 using the blank sector detection unit 224. The blank sector detection record 265 corresponding to the sector 400 is recorded in the blank region F-13b. When the number of the blank sync frame(s) is greater than the predetermined threshold 264, the sector 400 is determined to be a blank sector.

Step 40: Determine if the ECC block under consideration is a blank ECC block according to the number of the blank sector(s) in the ECC block using the blank ECC block detection unit 228. The blank sector detection record 265 corresponding to a sector in the ECC block indicates whether the sector is a blank sector. When the number of the blank sector(s) in the ECC block is greater than the predetermined threshold 266, the ECC block is determined to be a blank ECC block.

The predetermined thresholds 264 and 266 respectively utilized in Step 30 and Step 40 can be derived from experiments or trial tests. Additionally, both of the predetermined thresholds 264 and 266 can be adjusted by the MPU 104 using at least one MPU command, and the threshold storage unit 226 can be a register or a storage component that exists in the optical storage device 200. The existing register or storage component used as the threshold storage unit 226 is only an implementation choice and is not meant as a limitation to the present invention. According to another embodiment of the present invention, while both of the predetermined thresholds 264 and 266 are adjustable values, the predetermined thresholds 264 and 266 can be stored in the blank sector detection unit 224 and the blank ECC block detection unit 228, respectively. According to another embodiment of the present invention, the predetermined thresholds 264 and 266 can be fixed values stored in the blank sector detection unit 224 and the blank ECC block detection unit 228, respectively. According to yet another embodiment of the present invention, the blank sector detection unit 224 used in step 20 is capable of directly identifying the sync frame SF-I-J needing to be identified in the sync signal 254 as a normal sync frame or a blank sync frame according to whether the sync header of the sync frame SF-I-J is one of the normal sync headers SY0, SY1, . . . , and SY7 or one of the blank sync headers SY0', SY1', . . . , and SY7'. That is, the blank sector detection unit 224 of this embodiment may directly identify the normal sync headers SY0, SY1, . . . , and SY7 and the blank sync headers SY0', SY1', . . . , and SY7'.

It is an advantage of the present invention that when the blank detection of the optical storage disc is completed, the buffered data can be used as the data needed during error correction that will be performed according to error correction codes or used as the data needed for further decoding. Therefore, the present invention method and apparatus do not need to repeatedly perform the read action of the optical pickup module in the optical storage device. That is, during operations of the optical storage device, the blank detection and the buffering control are merged into one process to be performed together so that there is no need for extra movement and read action of the optical pickup module.

It is another advantage of the present invention that the first information can be the storage management information representing data recording states of the optical storage disc of the optical storage disc. Therefore, the speed of the blank detection can be increased. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing blank detection on an optical storage disc, the method comprising:
   (a) receiving first information read by an optical storage device from the optical storage disc, wherein when the receiving step is interrupted, the optical storage device is capable of generating second information according to track information of the optical storage disc so that the second information and the first information read by the optical storage device from the optical storage disc is continuously arranged; and
   (b) checking corresponding data of the received first information to operate blank detection for determining the first received information as blank data.

2. The method of claim 1, wherein the first information comprises storage management information of the optical storage disc, and the storage management information represents data recording states of the optical storage disc.

3. The method of claim 2, wherein the optical storage disc is a Blu-Ray Disc (BD), and the first information is Disc Management Area (DMA) information or Temporary Disc Management Area (TDMA) information.

4. The method of claim 2, wherein the optical storage disc is a High Definition Digital Versatile Disc (HD DVD), and the first information is Recording Management Zone (RMZ) information or Lead-In RMZ (L-RMZ) information.

5. The method of claim 1, wherein step (b) further comprises determining if an Error Correction Code (ECC) block derived from the first information is a blank ECC block according to the second information.

6. The method of claim 5, wherein the track information is a physical wobble signal of the optical storage disc.

7. The method of claim 5, wherein each ECC block includes at least one sector, each sector includes a plurality of sync frames, each sync frame includes a sync header for identifying the relative location of the sync frame with respect to the sector that the sync frame belong to, and step (b) further comprises:
   (b-1) identifying a first sync frame of the at least one sector as a normal sync frame or a blank sync frame according to whether the sync header of the first sync frame is a first sync header corresponding to the first information or a second sync header corresponding to the second information, respectively, wherein when the sync header of the first sync frame is a second sync header, the first sync frame is a blank sync frame;
   (b-2) determining if the at least one sector is a blank sector according to the number of the blank sync frames in the at least one sector, wherein when the number of the blank sync frames is greater than a first predetermined threshold, the at least one sector is a blank sector; and
   (b-3) determining if the ECC block is a blank ECC block according to the number of the blank sectors in the ECC block.

8. The method of claim 7, further comprising:
   adjusting the first predetermined threshold.

9. The method of claim 7, wherein each ECC block includes a plurality of sectors, and step (b-3) further comprises determining that the ECC block is a blank ECC block when the number of the blank sectors in the ECC block is greater than a second predetermined threshold.

10. The method of claim 1, further comprising:
    seeking locations within the information according to at least one seeking signal.

* * * * *